May 19, 1936. S. M. BÄCKSTROM 2,041,585
REFRIGERATION SYSTEM FOR MOTOR VEHICLES
Filed Oct. 24, 1933

INVENTOR.
S. M. Bäckstrom
BY
ATTORNEY.

Patented May 19, 1936

2,041,585

UNITED STATES PATENT OFFICE 2,041,585

REFRIGERATION SYSTEM FOR MOTOR VEHICLES

Sigurd Mattias Bäckstrom, Stockholm, Sweden, assignor, by mesne assignments, to Servel, Inc., Dover, Del., a corporation of Delaware Application October 24, 1933, Serial No. 694,922
In Germany November 12, 1932

12 Claims. (Cl. 62—117)

This invention relates to a refrigeration system for vehicles such as automobiles, railway cars, boats, and the like.

In the transport of produce it is desirable in many instances to maintain a lowered temperature in the storage compartment of the vehicle such as the hold of a vessel, truck body, or the like. In such installations, compression type refrigeration systems are especially subject to loss of refrigerant through leaks caused by vibration of the vehicle. Loss of refrigerant may occasion considerable inconvenience and damage since servicing or repair in transit is difficult.

Figure 2:
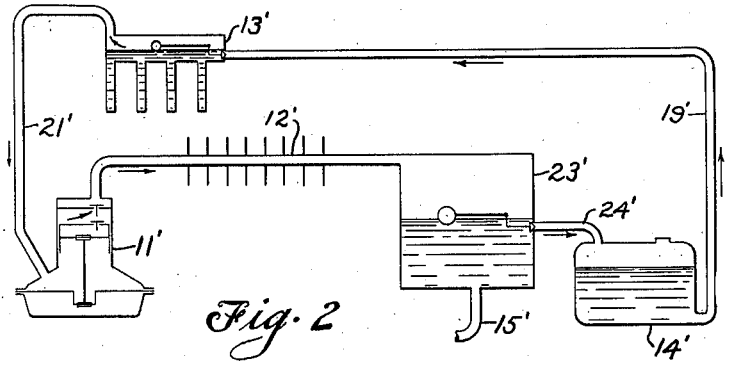
Figure 3:
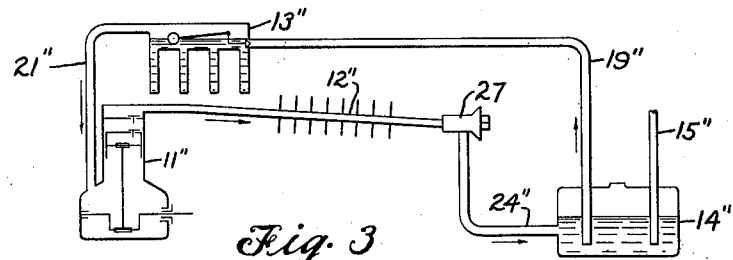
Figure 4:
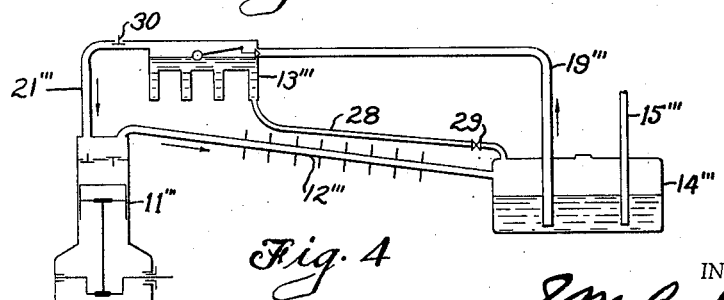

In accordance with this invention there is provided a refrigeration system of the compression type utilizing as refrigerant the fuel used for the vehicle motor thus eliminating the above difficulties. The invention will be more fully understood by reference to the following description taken in connection with the accompanying drawing in which Fig. 1 shows schematically a refrigeration system embodying the invention adapted for a vehicle operated by an internal combustion engine; and Figs. 2, 3, and 4 show schematically several modifications of the system.

Figure 1:
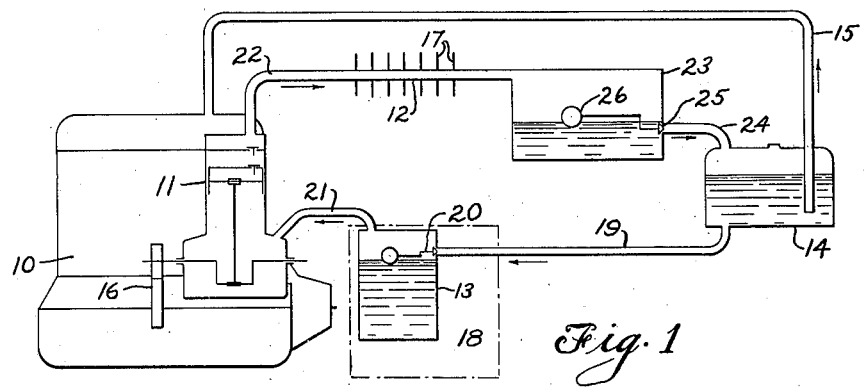

Referring to Fig. 1 of the drawing, the reference numeral 10 denotes an internal combustion engine for operating a motor truck, boat, or other vehicle. The refrigeration system comprises essentially a compressor 11, a condenser 12, and an evaporator or cooling element 13. The engine 10 is supplied with liquid fuel from a tank 14 through the fuel line 15 in any known manner as by a vacuum tank or fuel pump, not shown. The compressor 11 is driven by the vehicle engine 10 through a schematically illustrated transmission 16 although separate means for driving the compressor may be provided if so desired. The condenser 12 is shown provided with heat transfer fins 17 for air cooling as by fan draft or draft produced by the movement of the vehicle, but it will be understood that cooling of the condenser may be accomplished in any desirable manner such as by circulation of cooling water. The evaporator 13 may be of any suitable construction and located in the compartment to be cooled, generally indicated in outline at 18, or otherwise associated therewith for removal of heat as by a secondary heat transfer system.

The evaporator 13 is supplied with liquid fuel from the fuel tank 14 by gravity through conduit 19. The supply of liquid to the evaporator may be controlled by a float valve 20 or other suitable means. Pressure in the evaporator is reduced by suction of the vapor through conduit 21 to the compressor 11. Due to the lowered pressure in the evaporator the liquid vaporizes to produce a refrigerating effect as well known in the art. Obviously, construction of apparatus embodying the invention will differ in accordance with the fuel used as refrigerant and the temperature and capacity required, as well known in the art. Vapor withdrawn from the evaporator through suction conduit 21 is compressed in the compressor 11 and discharged through conduit 22 into the condenser 12. In the latter the compressed vapor is cooled and liquified, the liquid draining into a collection vessel or sump 23. From the latter the liquid fuel returns to the fuel tank 14 through conduit 24, the return of liquid being controlled by a valve 25 operated by a float 26 in the vessel or condenser sump 23.

In the embodiment of the invention illustrated by Fig. 2, the refrigeration system is similar to that described in connection with Fig. 1 except that the evaporator 13' is located at a higher level than the fuel tank 14'. Due to the lower pressure in the evaporator, liquid is supplied thereto from the fuel tank through the conduit 19' against the force of gravity. In this modification the fuel line 15' for conducting fuel to the engine is shown connected to the collection vessel or condenser sump 23' instead of directly to the fuel tank as in Fig. 1.

The modification shown in Fig. 3 is similar to that in Fig. 2 except that liquid from the condenser 12' returns directly to the fuel tank through a throttle valve 27 which may be an automatic or hand operated valve of any suitable type. The purpose of this valve is to maintain a certain pressure above atmospheric pressure in the condenser 12'' so that, even at high temperatures of the cooling air or other condenser cooling medium, condensation of the refrigerant fuel will occur.

In the modification illustrated in Fig. 4 the refrigeration system is in open communication with the atmosphere, without the insertion of any valve. The condenser 12''' discharges directly into the fuel tank and is therefore always at atmospheric pressure since the connection is made, as shown, above the liquid level in the tank. In this modification there is shown a drain 28 for water from the evaporator 13''' back to the fuel tank provided with a suitable valve 29. There is also provided a pressure equalizing valve 30 in the suction line 21''' from the evaporator to the compressor. The purpose of the valve 30 is to avoid what is usually referred to as water-hammer in the condenser and also permit the drainage of water from the evaporator back to the fuel tank through conduit 28. If the valve 30 is opened, for instance by hand, air flows into the low pressure side of the system thereby equalizing the pressures so that liquid in the evaporator 13''' may be drained through conduit 28 by opening the valve 29, thus returning to the fuel tank any nonvolatile matter which may be mixed with the fuel. It will be understood that the valves 29 and 30 may be operated by hand, or they may be arranged to automatically open in predetermined time intervals, for instance once each hour; or they may be arranged to automatically open when the engine stops. The latter arrangement will prevent water-hammer when the compressor is again put into operation. Depending upon the fuel used and the likelihood of water-hammer, a drain and pressure equalizing valve may also be found desirable in the previously described embodiments.

It will be apparent to those skilled in the art that various other changes may be made in the construction and arrangement without departing from the spirit of the invention, and therefore the invention is not limited to that which is described in the specification and shown in the drawing, but only as indicated in the following claims.

What is claimed is:

1. In combination with an internal combustion engine, a liquid fuel reservoir, a conduit for liquid from said reservoir to said engine, and a refrigeration system comprising an evaporator connected to receive liquid from said reservoir, a condenser connected to deliver liquid to said reservoir, and a compressor connected to withdraw vapor from said evaporator and compress the withdrawn vapor into said condenser.

2. In combination with an internal combustion engine, a liquid fuel reservoir, a conduit for liquid from said reservoir to said engine, and a refrigeration system comprising an evaporator connected to receive liquid from said reservoir, a condenser connected to deliver liquid to said reservoir, and a compressor connected to withdraw vapor from said evaporator and compress the withdrawn vapor into said condenser, said compressor being operated by said engine.

3. In combination with an internal combustion engine, a liquid fuel reservoir, a conduit for liquid from said reservoir to said engine, and a refrigeration system of the compression type connected to be supplied with liquid from said reservoir.

4. In combination with an internal combustion engine, a liquid fuel reservoir, a conduit for liquid from said reservoir to said engine, and a refrigeration system of the compressor-condenser-expander type connected to be supplied with liquid from said reservoir and including a compressor driven by said engine.

5. In combination with an internal combustion engine, a compression type refrigeration system including a liquid reservoir and adapted to utilize a refrigerant also suitable for the engine fuel, and a conduit for liquid from said reservoir to said engine.

6. In combination with an internal combustion engine, a liquid fuel reservoir, means for supplying liquid from said reservoir to said engine, and a refrigeration system comprising an evaporator connected to receive liquid from said reservoir, a compressor connected to withdraw vapor from said evaporator, a condenser connected to receive compressed vapor from said compressor, a conduit for liquid from said condenser to said reservoir and means in said conduit for maintaining a pressure differential between said condenser and reservoir.

7. In combination with an internal combustion engine, a liquid fuel reservoir, means for supplying liquid from said reservoir to said engine, and a refrigeration system comprising an evaporator connected to receive liquid from said reservoir, a compressor connected to withdraw vapor from said evaporator, a condenser connected to receive compressed vapor from said compressor and deliver liquid to said reservoir, and a float valve for controlling the delivery of liquid to the reservoir.

8. In combination with an internal combustion engine, a liquid fuel reservoir, means for supplying liquid from said reservoir to said engine, and a refrigeration system comprising an evaporator connected to receive liquid from said reservoir, a compressor connected to withdraw vapor from said evaporator, a condenser connected to receive compressed vapor from said compressor and deliver liquid to said reservoir, and a throttle valve for maintaining a higher pressure in said condenser than in said reservoir.

9. In combination with an internal combustion engine and a liquid fuel reservoir therefor, a refrigeration system of the compressor-condenser-expander type including said reservoir connected between the condenser and expander, and a valve controlled drain from the evaporator to said reservoir.

10. In combination with an internal combustion engine and a liquid fuel reservoir therefor, a refrigeration system of the compressor-condenser-expander type including said reservoir connected between the condenser and expander, a valve controlled drain from the evaporator to said reservoir, and a pressure relief valve in said system between the expander and compressor.

11. Apparatus of the character set forth including an internal combustion engine, means to conduct liquid fuel to said engine, an evaporator, a compressor connected to said evaporator, a condenser connected to said compressor, a common supply tank for supplying liquid to the first mentioned means and to said evaporator, means to conduct liquid from said condenser to said common tank, and means for maintaining different pressures in said condenser and in said tank.

12. Apparatus of the character set forth including an internal combustion engine, means to conduct liquid fuel to said engine, an evaporator, a compressor connected to said evaporator, a condenser connected to said compressor, a common supply tank for supplying liquid to the first mentioned means and to said evaporator, and means to conduct liquid from said condenser to said common tank.

SIGURD MATTIAS BÄCKSTROM.